April 26, 1955
W. S. MASTER
2,707,251
DRY CONTACT RECTIFIER
Filed Sept. 3, 1953
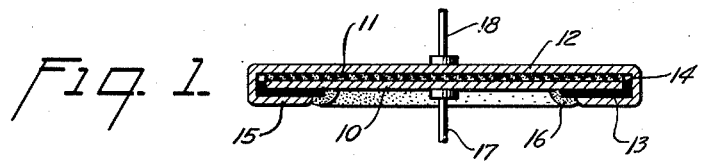
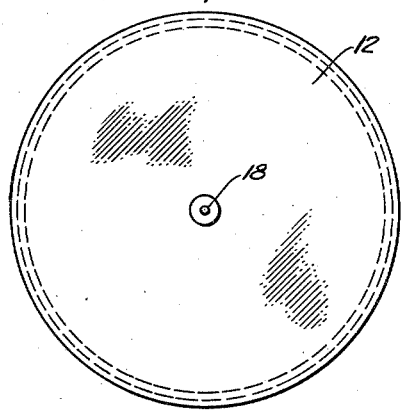
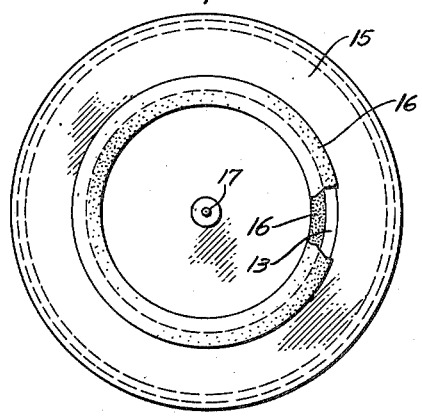
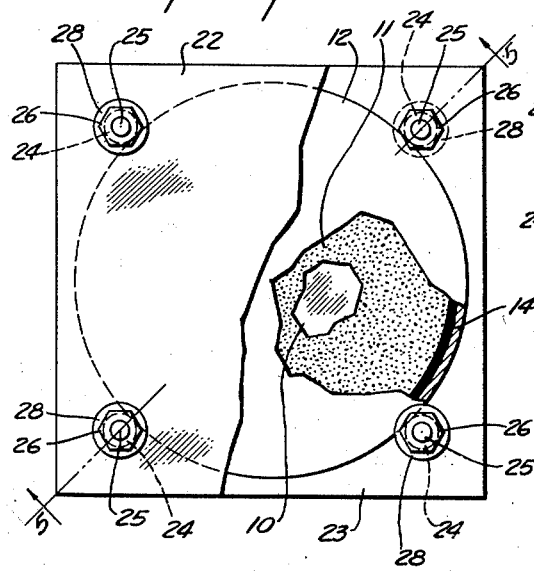
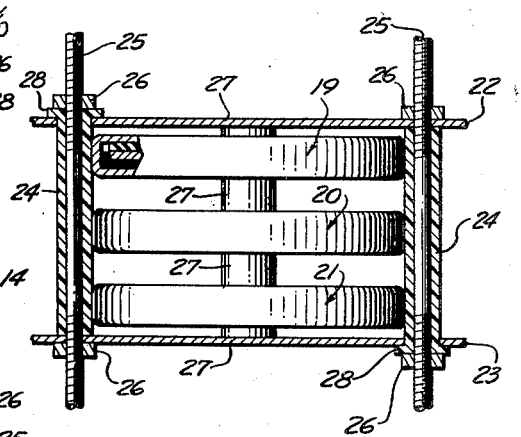
INVENTOR.
W. S. MASTER
BY R. P. Morris
ATTORNEY.

United States Patent Office

2,707,251
Patented Apr. 26, 1955

2,707,251

DRY CONTACT RECTIFIER

Warren S. Master, Rutherford, N. J., assignor to International Telephone and Telegraph Corporation, New York, N. Y., a corporation of Maryland Application September 3, 1953, Serial No. 378,221

2 Claims. (Cl. 317—234)

This invention relates to rectifiers and more particularly it relates to rectifiers of the contact kind.

Hermetically sealed rectifiers are often required for special applications. In the past such hermetically sealed rectifiers have been provided by sealing the entire stack or assembly. However, the procedure proposed has been relatively expensive and the resulting construction is generally rather bulky and heavy.

In accordance with this invention the difficulties outlined above are avoided by providing a simple construction wherein, the individual rectifier cells are hermetically sealed, making it unnecessary to seal the entire assembly when several such cells are used in a stack.

Another feature relates to a mechanically strong and electrically stable selenium rectifier unit which is capable of stacked assembly to form a rigid multi-unit weatherproof rectifier.

A further feature relates to the novel combination and interconnection of parts which cooperate to form a more stable rectifier of the large-area contact kind.

Other features and advantages will appear as the ensuing description proceeds.

In the drawing, which shows by way of example certain preferred embodiments,

Fig. 1 is a sectional view of a contact rectifier according to the invention;

Fig. 2 is a top plan view of Fig. 1;

Fig. 3 is a bottom view of Fig. 1;

Fig. 4 is a top plan view of a modification showing the unit of Figs. 1 to 3 designed for stacked assembly;

Fig. 5 is a sectional view of Fig. 4 taken along the line 5—5 thereof.

While large-area contact rectifiers have been known for a considerable time, I have found that their characteristics are rendered more stable and reliable if the contact area is protected against moisture, dust, and the like. This is particularly true in the case of the so-called selenium contact rectifier. The present invention provides a construction for such rectifiers whereby they can be made and hermetically sealed with a minimum of manufacturing cost.

Referring to Figs. 1 to 3, the rectifier comprises a metal disc or base plate 10 of iron or other similar metal, one surface of which is provided with a coating 11 of selenium and the usual counterelectrode. Preferably, although not necessarily, the plate 10 and the coating 11 are circular in shape. Placed in contact with the coating 11 is a flat, thin metal sheet 12, which is also circular in shape and has its rim spun over and around the circular edge of the plate 10. Before effecting this spinning or turning operation a ring 13 of insulating material is placed in contact with the lower face of plate 10 to prevent short circuiting of the counterelectrode and base plate. Preferably, the ring 13 has a vertical lip or margin 14 which fits against the peripheral edge of plate 10. The insulation material 13 may be of any type well known in the insulating art. For example, it may be of rubber, "neoprene," or of any suitable thermoplastic or thermosetting insulation material. After the ring 13 has been placed in position, the circular margin of the thin metal plate 12 is spun over and around the edge and the rolled-back portion 15 can be pressed or crimped against the insulator ring 13 to hermetically seal the contacting interface between the iron plate 10 and the selenium coating 11. If desired, an additional annular bead of insulating and moisture-proof cement 16 may be applied to assure even further the hermetic sealing of the parts.

The base plate 10 may be provided with any suitable contact lug or contact finger 17, which may be suitably attached to the plate 10. Likewise another contact lug or finger 18 is attached to the metal jacket 12. The jacket 12, may be used instead of the usual counterelectrode and this may perform the double function of enclosing the rectifier interface between elements 10 and 11 and providing a large-area contact for the selenium layer 11, and with which it is in electrical contact. It will be understood, of course, that the respective contacts to the jacket 12 and the plate 10 can be made by any well known contacting means such as resilient spring fingers and the like.

While Figs. 1 to 3 show a single unit selenium rectifier, this unit is capable of being assembled in a staked array as illustrated, for example, in Figs. 4 and 5 of the drawing. Fig. 5 shows three such units designated 19, 20, 21 each of which may be made according to the embodiment of Figs. 1 to 3. The units are clamped between spaced metal end plates 22, 23, through which pass at the four corners of the plates 22 and 23 insulator bushings 24 and through which bushings pass respective support rods 25. These rods may be threaded at their ends to receive respective fastening nuts 26. The external diameter of the bushings 24 is so chosen that when the bushings are assembled on the rods and between the end plates 22, 23, the said bushings bear against the peripheries of the respective rectifier units 19, 20, 21, thus holding these units in concentric relation. For the purpose of connecting the units in series and spacing them apart, suitable metal washers 27 may be located between the units. One of the rods, for example the left-hand rod 25, is in direct connection with the plate 23, thus providing one terminal for the device. The insulating bushing 24 is then provided at its opposite end with an integral insulating collar 28 so that the fastening nut 26 does not make contact at the end plate 22. On the other hand, the right-hand support rod 25 is in direct contact with plate 22 by means of the nut 26, while the other end of the right-hand rod 25 is insulated from plate 23 by the insulating collar 28. Thus, the rods 25, in addition to acting as support and clamping rods, may also serve as the terminals for the series connected rectifier units 19, 20 and 21.

While reference has been made in Figs. 1–5 to a contact rectifier of the iron-selenium type, other contact metals may be employed, for example copper and copper-oxide. Likewise, while the selenium element has been referred to as a coating, it may take the form of a sheet or disc.

While certain specific embodiments have been disclosed herein, various changes and modifications may be made therein without departing from the spirit and scope of the invention.

What is claimed is:

1. A rectifier comprising a series of similar extended-area contact rectifier units, each unit including a base electrode member and a counter-electrode member with an asymmetric conductive interface therebetween, a metal jacket hermetically sealing said interface, said metal jacket being in direct contact with one of the rectifier members and being hermetically sealed and insulated from the other rectifier member, a pair of end plates between which said units are stacked, a pair of insulator bushings extending between said end plates and abutting against the margins of said rectifier units to hold them in concentric relation between the plates, and a metal rod passing through each of said bushings and in contact with said units for connecting said units in circuit.

2. A rectifier according to claim 1 in which each of said units has an hermetic sealed metal jacket which encloses each unit while leaving the central portion of one of the electrode members of each unit exposed, and a conductive spacing washer located between the said exposed surface of one unit and a metal jacket of the next adjacent unit.

References Cited in the file of this patent

UNITED STATES PATENTS

| 1,671,247 | Levy | May 29, 1928 |
| 2,454,846 | Skinker | Nov. 30, 1948 |
| 2,462,186 | Hein | Feb. 22, 1949 |